US007669271B2

(12) United States Patent
Gonzalez Alemany et al.

(10) Patent No.: US 7,669,271 B2
(45) Date of Patent: Mar. 2, 2010

(54) DATA AND ENERGY TRANSMISSION SYSTEM FOR PASSENGER BOARDING BRIDGES FOR AIRPLANES

(75) Inventors: Miguel Angel Gonzalez Alemany, Oviedo (ES); Julian Fernandez Diaz, Oviedo (ES); Alberto Florez Castro, Lugo de Llanera (ES)

(73) Assignees: Thyssenkrupp Elevator Innovative Center, S.A., Asturias (ES); Thyssenkrupp Elevator (ES/PBB) Ltd., London (GB)

( * ) Notice: Subject to any disclaimer, the term of this patent is extended or adjusted under 35 U.S.C. 154(b) by 0 days.

(21) Appl. No.: 12/252,761

(22) Filed: Oct. 16, 2008

(65) Prior Publication Data
US 2009/0184587 A1 Jul. 23, 2009

(30) Foreign Application Priority Data
Jan. 23, 2008 (ES) ................................ 200800164

(51) Int. Cl.
*E01D 1/00* (2006.01)
(52) U.S. Cl. .......................................... 14/71.5; 285/47
(58) Field of Classification Search ......... 14/69.5–71.5; 285/47
See application file for complete search history.

(56) References Cited

U.S. PATENT DOCUMENTS

| 3,521,316 A | * | 7/1970 | Adams et al. ................. 14/71.5 |
| 4,391,297 A | * | 7/1983 | Knight ........................ 137/615 |
| 4,572,550 A | * | 2/1986 | Harder ......................... 285/47 |
| 4,715,077 A | * | 12/1987 | Shepheard ................... 14/71.5 |
| RE32,687 E | * | 6/1988 | Shepheard ................... 14/71.5 |
| 5,149,017 A | * | 9/1992 | McEntire et al. ......... 244/114 R |
| 5,226,204 A | * | 7/1993 | Schoenberger et al. ....... 14/71.5 |
| 6,849,962 B2 | * | 2/2005 | McCool ....................... 290/1 R |

* cited by examiner

*Primary Examiner*—Raymond W Addie
(74) *Attorney, Agent, or Firm*—Merchant & Gould P.C.

(57) ABSTRACT

The invention relates to a data and energy transmission system for telescopic boarding bridges with an inner section (2) joined to a first structure (4) and an outer section (3) connected to a second structure (5). The system has conductor rails (6) along the inner section (2) of the telescopic tunnel (1) connected to the first structure (4), and at least one pantograph mechanism (7) for electrically connecting the conductor rails (6) with the second structure (5), which is in permanent contact with said conductor rails (6) sliding along such rails accompanying the extension and retraction of the telescopic tunnel (1). There are additionally data transmission means connected to the first structure (4) and to the second structure (5).

14 Claims, 2 Drawing Sheets

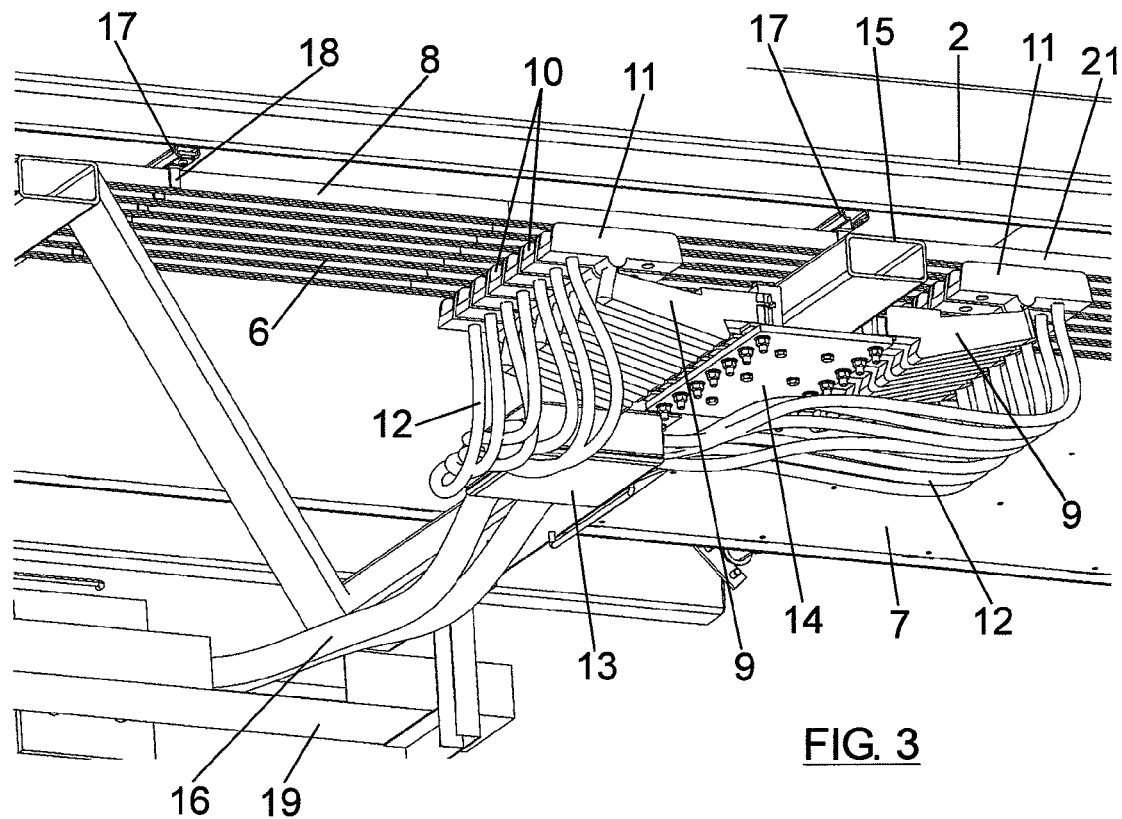
FIG. 3
FIG. 4
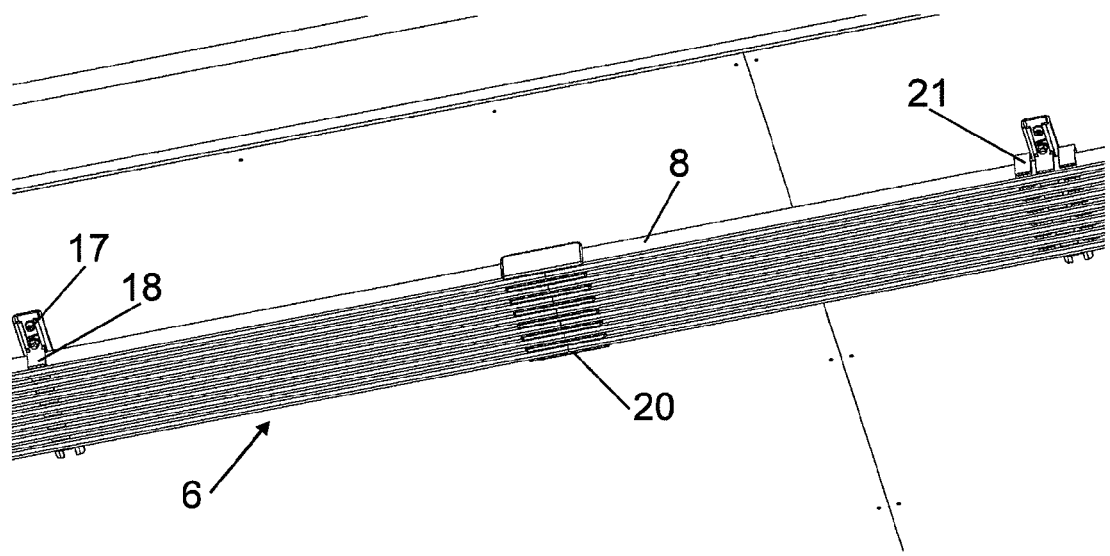

DATA AND ENERGY TRANSMISSION SYSTEM FOR PASSENGER BOARDING BRIDGES FOR AIRPLANES

This application claims benefit of Serial No. 200800164, filed 23 Jan. 2008 in Spain and which application is incorporated herein by reference. To the extent appropriate, a claim of priority is made to the above disclosed application.

TECHNICAL FIELD OF THE INVENTION

The present invention belongs to the technical field of extendable communication structures, more specifically to passenger boarding bridges for airplanes, and more specifically to transmission systems for transmitting energy and data such as sound or video between the different points of the bridge, specifically to data and energy transmission from a connection point near the terminal to an electric cabinet at the final end of the bridge, from which point the energy will be transmitted to the remaining parts of said bridge.

BACKGROUND OF THE INVENTION

The need to carry out the connection between the Terminal of the airport and aircraft arose during the first half of the $20^{th}$ century, with the appearance of the first commercial airlines. The design of boarding bridges has undergone changes over time and technological improvements have been made which respond to new customer expectations and which have taken root and extended in new designs.

Currently known bridges are formed by a rotating structure known as rotunda connected to the facade of the Terminal where the passengers board and disembark; a rotunda support structure called column, a tunnel formed by a telescopic structure which allows modifying the length of the bridge according to the distance between the Terminal and the airplane boarding door; an elevation system also formed by a telescopic structure on which the tunnel is supported and which allows modifying its height and adapting to the airplane door level, a running system on which the elevation system is supported and which allows the movement of the bridge on the airport platform, a rotating structure called cabin which can be used as a link between the bridge and the airplane, a circular structure called cabin rotunda on which the cabin rotates; and stairs usually located at the end of the bridge closest to the airplane which allow accessing the bridge from the airport platform.

Conventional telescopic boarding bridges for an airport require a system which allows transmitting both the electric energy and the control signals to all the used systems. The electric power generally goes from the connection, normally located in the column, which is the fixed part, to the electric cabinet located in the cabin rotunda. The energy is distributed from there to all the electric devices located in the different parts of the bridge, both fixed and mobile.

Transmission systems based on using mobile cables have been used up until now in order to fulfill this purpose.

One of these systems is formed by a beam secured by several angle bars to the upper part of one of the sides of the outer telescopic tunnel of the bridge. This beam has at its lower part a rail over which the carriages holding the cables slide, such that when the bridge is extended the cables are extended on the sliding carriages, which are equidistant from each other, whereas when the machine is retracted, the carriages move closer together such that the cables hang forming tails on the side of the bridge, which creates an unaesthetic effect in addition to interfering with other elements of the bridge.

Another of the systems used consists of a cable holder chain causing the movement of the cables during the telescopic movement of the tunnels of the bridge, taking them through a standard link chain, which is fixed at one end to the outer tunnel and at the other end to the inner tunnel. This chain is supported on a tray located on the lower part of the tunnels.

Both solutions subject the cables to continuous stresses, causing breaks of the conductor and/or the insulator which end up rendering the bridge inoperative over time. Furthermore they are very large systems, which involves a problem from the aesthetic and assembly point of view.

A transmission system for efficiently and comfortably transmitting energy and data from a connection point to all parts of the bridge, preventing the drawbacks existing in the previous systems of the state of the art, was therefore desirable.

SUMMARY OF THE INVENTION

The present invention solves the problems existing in the state of the art by means of a data and energy transmission system for passenger boarding bridges for airplanes, of those having a telescopic tunnel with variable length. The telescopic tunnel is formed by an inner section which is connected to a first structure and by an outer section connected to a second structure, the first structure being connected with the second structure in a telescopic, extendable and retractable manner.

According to a particular embodiment of the invention, the first structure is connected to a terminal of the airport and the second structure is connected to an airplane boarding door. In this case, the inner section connected to the first structure remains fixed, and it is the outer section connected to the second structure which moves with respect to the inner section in a telescopic, extendable and retractable manner.

In contrast, according to an alternative embodiment of the invention, it is the second structure which is connected to the terminal of the airport, the first structure being connected to the airplane boarding door. In this case, it is the outer section connected to the second structure which remains fixed, and the inner section connected to the first structure which moves with respect to the outer section in a telescopic, extendable and retractable manner.

The present data and energy transmission system has conductor rails arranged along the outer surface of the inner section of the telescopic tunnel, and which are electrically connected with the first structure. These conductor rails can be arranged on the lower surface of the inner section, or on the upper surface of this inner section, or on the sides of the inner section of the telescopic rails.

The rails can be single-pole or multipole rails and can be made of copper, aluminium or any other conductive material, and for safety they will always be insulated by means of an insulating material.

As a main element, the system has pantographs electrically connecting the conductor rails with the second structure. These pantographs are in permanent contact with the conductor rails, sliding along the latter following the relative movement of the outer section and the inner section of the telescopic tunnel during the extension and retraction of said telescopic tunnel.

The system additionally has data transmission means connected to the first structure and to the second structure.

The sliding of the pantographs on the conductor rails thus allows data and current transmission between the first structure and the second structure, this energy and data being transmitted from said first and second structure to the other points of the telescopic tunnel.

The system can be formed by several series of conductor rails with their corresponding pantographs distributed over the outer surface of the inner section.

According to a specific embodiment of the invention, the pantograph mechanism has at least one socket arm to which brush holders are fixed in correspondence with each of the conductor rails. Each of the brush holders carries a brush, each of the brushes permanently making contact with one of the conductor rails.

The brushes of the pantograph mechanism allow current transmission between the first structure and the second structure through a set of cables to a terminal box, from which there emerges a plurality of connecting cables to the second structure.

The socket arm is fixed by means of a plate for the connection to a drive arm which joins the pantograph mechanism to the conductor rails and allows its sliding along such rails.

The pantograph mechanism for each of the conductor rails will preferably consist of two socket arms each of them connected by means of a set of cables to the terminal box, and fixed by means of the plate for the connection to the drive arm. This embodiment provides a greater contact surface as well as greater continuity in data and energy transmission.

The socket arms can further have contact means pressing said socket arm against the conductor rails, thus ensuring permanent contact between the pantograph mechanism and the conductor rails.

By means of this data and energy transmission system, a savings in the costs upon preventing all the wiring necessary in the systems of the state of the art, an increase of the reliability of said transmissions, since the deterioration of this system is much more difficult than that of any of the previous systems by means of cables, and an improvement in the aesthetics of the bridge are achieved.

This transmission system can be applied to bridges with tunnels formed by an outer section and by an inner section, and additionally to bridges with tunnels formed by more than one inner section, inserted into one another and allowing a greater retraction and extension of the tunnels. In this case the conductor rails are arranged on the outer surface of all the additional inner sections in continuity with those arranged on the outer surface of the first inner section, and the pantograph means will move as the tunnel is extended or retracted along these inner rails.

BRIEF DESCRIPTION OF THE DRAWINGS

An embodiment of the invention referring to a series of figures will be described below in an illustrative but non-limiting manner in order to facilitate the understanding of the invention.

FIG. 3 shows a perspective view of the elements of FIG. 2 with a much greater level of detail.

FIG. 4 is a perspective view which shows the fixing of the conductor rails of the present invention to the tunnel of the bridge.

Figure 1:
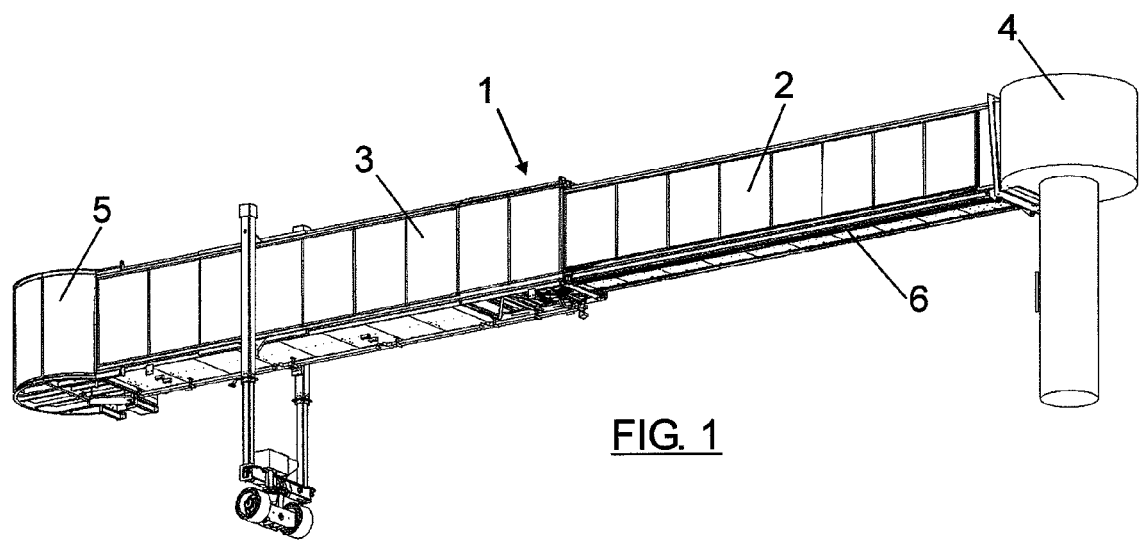
FIG. 1 generally shows a perspective view of an embodiment of the transmission system object of the invention applied to a bridge.

These figures refer to a set of elements which are:
1. telescopic tunnel
2. inner section
3. outer section
4. first structure
5. second structure
6. conductor rails
7. pantographs
8. insulating casing of the rails
9. socket arm
10. brushes
11. brush holders
12. current transmission cables between the brush and the terminal box
13. terminal box
14. pantograph assembly plate
15. drive arm
16. connecting cables
17. rail fixing profile
18. rail fixing supports
19. tray
20. rail union fittings
21. clamps for locking the profiles

DETAILED DESCRIPTION OF THE PREFERRED EMBODIMENTS

FIG. 1 shows an embodiment of the data and energy transmission system for bridges object of the invention arranged on a bridge of the type of those having a telescopic tunnel 1 with variable length. The tunnel is formed by at least an inner section 2 connected to a first structure 4 and by an outer section 3 telescopically connecting the inner section 2 with a second structure 5.

According to a preferred embodiment of the invention, which is that shown in FIG. 1, the first structure 4 is connected to a terminal of the airport, and the second structure 5 is connected to an airplane boarding door. In this case, the inner section 2 connected to the first structure 4 remains fixed, and it is the outer section 3 connected to the second structure 5 which moves with respect to the inner section 2 in a telescopic, extendable and retractable manner.

In contrast, according to an alternative embodiment of the invention, not shown in the figures, it is the second structure 5 which is connected to the terminal of the airport, the first structure 4 being connected to the airplane boarding door. In this case, it is the outer section 3 connected to the second structure 5 which remains fixed, and the inner section 2 connected to the first structure 4 which moves with respect to the outer section 3 in a telescopic, extendable and retractable manner.

Figure 2:
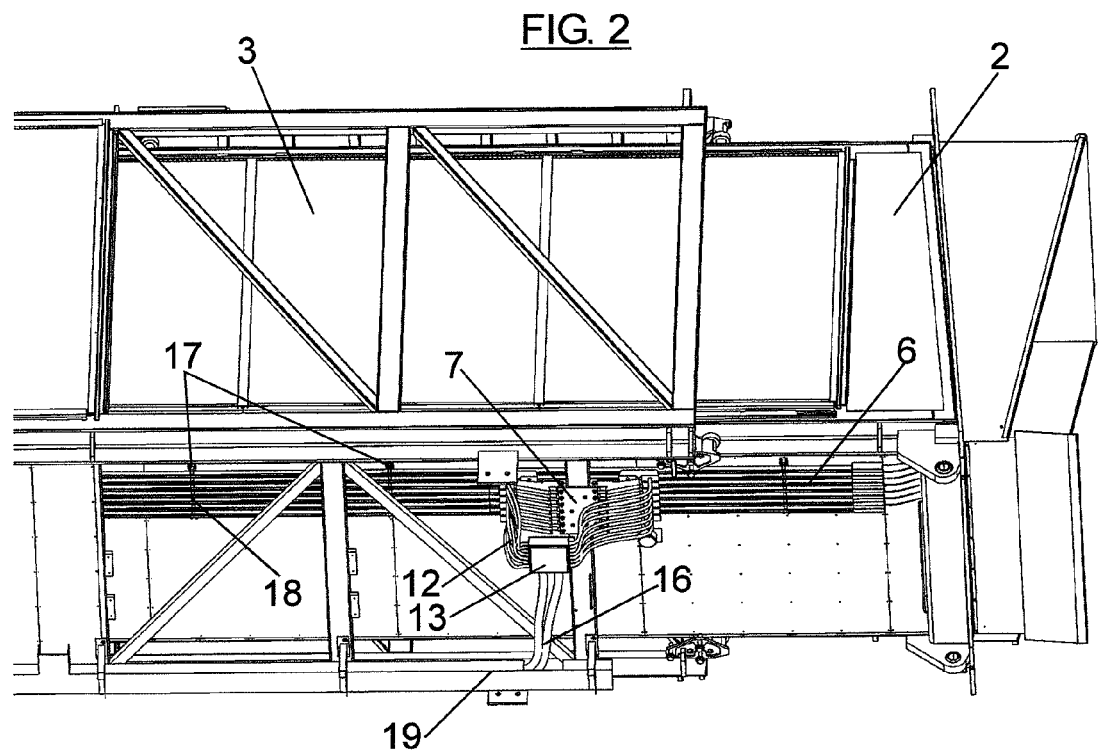
FIG. 2 is an elevational view showing with detail the fixing of the system object of the invention of FIG. 1 in the sections of the tunnel.

As can be observed in FIG. 1, and with more detail in FIGS. 2 and 3, the system object of the present invention has at least a series of conductor rails 6 which are arranged along the inner section 2 on its outer surface. These conductor rails 6 are electrically connected to the first structure 4. The conductor rails 6 can be single-pole or multi-pole rails and are made of copper, aluminium or any other conductive material, and for safety reasons they will always be insulated by means of an insulating casing 8, which is preferably made of plastic.

As is shown in FIGS. 1 to 3, the series of conductor rails 6 is preferably arranged on the lower surface of the inner section 2. However according to different alternative embodiments the conductor rails 6 can be arranged on the upper surface of the inner section 2 or on the sides of said inner section 2 of the tunnels.

FIG. 4 shows the fixing of the conductor rails 6 on the surface of the section 2. These conductor rails 6 are preferably fixed by means of a series of supports 18 longitudinally placed on profiles 17, although alternative fixing means such as hanging bolts can be used. The conductor rails 6 are joined to one another by means of union fittings 20. Furthermore in order to prevent unwanted movements of the conductor rails 6, locking clamps 21 are installed on both sides of the fixing supports 18 when the length of the conductor rails 6 requires it.

The system additionally has at least one pantograph mechanism 7 for electrically connecting the series of conductor rails 6 with the second structure 5. This pantograph mechanism 7 is in permanent contact with the conductor rails 6, sliding along the latter following the movement of section 3 of the telescopic tunnel 1 with respect to the section 2 during the extension and retraction of the telescopic tunnel 1.

The system additionally has data transmission means, not shown in the figures, which are connected to the first structure 4 and to the second structure 5.

The sliding of the pantograph mechanism 7 on the series of conductor rails 6 allows data and current transmission between the first structure 4 and the second structure 5, said energy and data being transmitted from the first structure 4 and the second structure 5 to the other points of the telescopic tunnel 1.

At least five conductor rails 6 are necessary for efficient data and energy transmission, one for each phase, R,S,T, one for the neutral connection, and another for the ground connection. However a larger number of conductor rails 6 can be used for improving data and energy transmission. Additionally, as many rails as necessary can be installed for transmitting signals or for supplying other auxiliary devices installed in the bridge.

As can be seen in FIG. 3, in a preferred embodiment of the pantograph mechanism 7, it is formed by at least one socket arm 9, to which brush holders 11 are fixed in correspondence with each of the conductor rails 6. Each brush holder 11 carries a brush 10 such that each of the brushes 10 makes permanent contact with one of the conductor rails 6, the brushes 10 of the pantograph mechanism 7 allowing data and current transmission between the first structure 4 and the second structure 5 through a set of transmission cables 12 to a terminal box 13. A plurality of connecting cables 16 going to the second structure 5 emerge from this terminal box 13.

In addition, the socket arm 9 is fixed by means of an assembly plate 14 to a drive arm 15, joining the pantograph mechanism 7 to the series of conductor rails 6, allowing its sliding along these rails.

In this preferred embodiment of the pantograph mechanism 7, it has two socket arms 9, each of them connected by means of a set of transmission cables 12 to the terminal box 13. In this case, the two socket arms 9 are fixed by means of the assembly plate 14 to the drive arm 15. A greater contact surface is thus ensured as well as greater continuity in the data and energy transmission.

In a preferred embodiment of the pantograph mechanism, the socket arm 9 has contact means pressing it against the conductor rails 6 ensuring permanent contact between the pantograph mechanism 7 and the conductor rails 6 and thus preventing a deficient energy transmission or a loss of data due to the fact that the pantograph mechanism 7 would stop having contact with the conductor rails 6 at any moment. These contact means preferably consist of conventional springs.

The data transmission means preferably comprise a transceiver and a powerline modem for powerline communications, connected to the first structure 4 and a transceiver and a powerline modem for powerline communications connected to the second structure 5.

Data is transmitted making use of two of the supply rails of the machine.

In another alternative embodiment of the transmission system, the data transmission means can be either bluetooth® transmission means, transmission means infrared transmission means, or wireless transmission means.

This description is being made for the case in which the telescopic tunnel 1 is formed only by an inner section 2 and an outer section 3 for the extension and retraction of the telescopic tunnel 1, but it can be additionally applied to telescopic tunnels 1 having more than one inner section. In this case, the additional inner sections are inserted into one another, all of them being outside the inner section 2 and inside the outer section 3, obtaining with their movement the extension and retraction of the telescopic tunnel 1, and providing greater extension and retraction due to the large number of sections, and which will be used for boarding in airplanes located in a place further from the terminal. In this embodiment, the conductor rails 6 are arranged on the outer surface of the additional inner sections in continuity with those arranged on the outer surface of the first inner section 2.

Furthermore, according to a particular embodiment, the transmission system has several series of conductor rails 6, and a plurality of pantograph mechanisms 7 in correspondence with said series of conductor rails.

The transmission system object of the present invention additional has a tray 19 arranged below the outer section 3 of the telescopic tunnel or any other similar device for securing the cables 16 emerging from the terminal box 13 and going to the second structure 5.

The invention claimed is:

1. A data and energy transmission system for passenger boarding bridges for airplanes of the type of those comprising
    a telescopic tunnel with variable length comprising at least
        an inner section connected to a first structure, and
        an outer section telescopically connecting the inner section with a second structure,
    said data and energy transmission system wherein it comprises
        at least a series of conductor rails insulated by means of an insulating casing, arranged along the inner section of the telescopic tunnel, on the outer surface of the latter, being electrically connected to the first structure,
        at least one pantograph mechanism electrically connecting the series of conductor rails with the second structure, which is in permanent contact with said conductor rails, sliding along such rails following the movement of the outer section of the telescopic tunnel with respect to the inner section during the extension and retraction of the telescopic tunnel,
        and data transmission means connected to the first structure and to the second structure,
    the sliding of the pantograph mechanism on the series of conductor rails allowing data and current transmission between the first structure and the second structure, said energy and data being transmitted from said first structure and second structure to the other points of the telescopic tunnel.

2. A data and energy transmission system for passenger boarding bridges for airplanes according to claim 1, wherein the pantograph mechanism comprises
    at least one socket arm to which there is fixed
        brush holders in correspondence with each of the conductor rails, each brush holder carrying
            a brush, each of the brushes making contact with one of the conductor rails, the brushes of the pantograph mechanism allowing data and current transmission between the first structure and the second structure through
    a set of transmission cables to
    a terminal box, from which there emerges
    a plurality of connecting cables to the second structure,
the socket arm being fixed by means of
    an assembly plate to
    a drive arm joining the pantograph mechanism to the series of conductor rails and allowing its sliding along such rails.

3. A data and energy transmission system for passenger boarding bridges for airplanes according to claim 1, wherein the pantograph mechanism comprises two socket arms, each of them connected by means of a set of transmission cables to the terminal box, the two socket arms being fixed by means of the assembly plate to the drive arm.

4. A data and energy transmission system for passenger boarding bridges for airplanes according to claim 1, wherein the data transmission means comprise a transceiver and a PLC modem for powerline communications connected to the first structure and a transceiver and a PLC modem for powerline communications connected to the second structure.

5. A data and energy transmission system for passenger boarding bridges for airplanes according to claim 1, wherein the data transmission means are selected from bluetooth® transmission means, infrared transmission through, wireless transmission means and a combination of the above.

6. A data and energy transmission system for passenger boarding bridges for airplanes according to claim 1, wherein the series of conductor rails is arranged on the lower surface of the inner section.

7. A data and energy transmission system for passenger boarding bridges for airplanes according to claim 1, wherein the series of conductor rails is arranged on the upper surface of the inner section.

8. A data and energy transmission system for passenger boarding bridges for airplanes according to claim 1, wherein the series of conductor rails is arranged on the sides of the inner section.

9. A data and energy transmission system for passenger boarding bridges for airplanes according to claim 1, wherein it comprises a plurality of series of conductor rails arranged along the inner section, and a plurality of pantograph mechanisms in correspondence with said series of conductor rails.

10. A data and energy transmission system for passenger boarding bridges for airplanes according to claim 1, wherein the telescopic tunnel additionally comprises at least one additional inner section outside inner section and inside outer section, the conductor rails being arranged on the outer surface of said additional inner section in continuity with those arranged on the outer surface of the inner section (2).

11. A data and energy transmission system for passenger boarding bridges for airplanes according to claim 2, wherein the socket arm comprises contact means pressing said socket arm against the conductor rails, ensuring permanent contact between the pantograph mechanism and the conductor rails.

12. A data and energy transmission system for passenger boarding bridges for airplanes according to claim 1, wherein it comprises a tray arranged below the outer section of the telescopic tunnel on which the plurality of connecting cables is located.

13. A data and energy transmission system for passenger boarding bridges for airplanes according to claim 1, wherein
    the first structure is connected to a terminal of the airport and
    the second structure is connected to a boarding door of an airplane,
the inner section being connected to the first fixed structure and the outer section being connected to the second structure which moves with respect to the inner section in a telescopic, extendable and retractable manner.

14. A data and energy transmission system for passenger boarding bridges for airplanes according to claim 1, wherein
    the second structure is connected to a terminal of the airport and
    the first structure is connected to a boarding door of an airplane,
the outer section being connected to the second fixed structure and the inner section being connected to the first structure which moves with respect to the outer section in a telescopic, extendable and retractable manner.

* * * * *

UNITED STATES PATENT AND TRADEMARK OFFICE
CERTIFICATE OF CORRECTION

PATENT NO. : 7,669,271 B2
APPLICATION NO. : 12/252761
DATED : March 2, 2010
INVENTOR(S) : Gonzalez Alemany et al.

It is certified that error appears in the above-identified patent and that said Letters Patent is hereby corrected as shown below:

Cover page, (73) Assignees: "Thyssenkrupp Elevator Innovative Center, S.A." should read --Thyssenkrupp Elevator Innovation Center, S.A.--

Signed and Sealed this

Twenty-fourth Day of August, 2010

David J. Kappos
*Director of the United States Patent and Trademark Office*